(12) United States Patent
Patel

(10) Patent No.: US 8,565,714 B2
(45) Date of Patent: Oct. 22, 2013

(54) IDENTIFYING PUBLIC SAFETY ANSWERING POINT (PSAP) CALLBACKS IN INTERNET PROTOCOL (IP) MULTIMEDIA SUBSYSTEM (IMS) EMERGENCY SERVICES

(75) Inventor: Milan Patel, Middlesex (GB)

(73) Assignee: Interdigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/348,968

(22) Filed: Jan. 12, 2012

(65) Prior Publication Data

US 2012/0184238 A1 Jul. 19, 2012

Related U.S. Application Data

(60) Provisional application No. 61/433,053, filed on Jan. 14, 2011.

(51) Int. Cl.
*H04W 4/22* (2009.01)
(52) U.S. Cl.
USPC ................................. 455/404.1; 379/45
(58) Field of Classification Search
USPC ............... 455/404.1, 404.2, 466; 370/352; 340/540; 709/228
See application file for complete search history.

(56) References Cited

U.S. PATENT DOCUMENTS

| 2007/0060097 | A1 | 3/2007 | Edge et al. | |
|---|---|---|---|---|
| 2009/0296688 | A1 | 12/2009 | Bakker et al. | |
| 2012/0028598 | A1* | 2/2012 | Bakker et al. | 455/404.1 |

FOREIGN PATENT DOCUMENTS

WO 2008/151406 12/2008

OTHER PUBLICATIONS

Rosenberg et al., "SIP: Session Initiation Protocol," Network Working Group, RFC: 3261 (Jun. 2002).
Third Generation Partnership Project, "Technical Specification Group Core Network and Terminals; Interworking between the IP Multimedia (IM) Core Network (CN) subsystem and Circuit Switched (CS) networks (Release 6)," 3GPP TS 29.163 V6.12.0 (May 2009).
Third Generation Partnership Project, "Technical Specification Group Core Network and Terminals; Interworking between the IP Multimedia (IM) Core Network (CN) subsystem and Circuit Switched (CS) networks (Release 7)," 3GPP TS 29.163 V7.25.0 (Dec. 2011).
Third Generation Partnership Project, "Technical Specification Group Core Network and Terminals; Interworking between the IP Multimedia (IM) Core Network (CN) subsystem and Circuit Switched (CS) networks (Release 7)," 3GPP TS 29.163 V7.21.0 (Dec. 2010).
Third Generation Partnership Project, "Technical Specification Group Core Network and Terminals; Interworking between the IP Multimedia (IM) Core Network (CN) subsystem and Circuit Switched (CS) networks (Release 8)," 3GPP TS 29.163 V8.13.0 (Dec. 2010).
Third Generation Partnership Project, "Technical Specification Group Core Network and Terminals; Interworking between the IP Multimedia (IM) Core Network (CN) subsystem and Circuit Switched (CS) networks (Release 8)," 3GPP TS 29.163 V8.17.0 (Dec. 2011).

(Continued)

*Primary Examiner* — Phuoc Doan
(74) *Attorney, Agent, or Firm* — Volpe and Koenig, P.C.

(57) ABSTRACT

A method and apparatus for identifying public safety answering point (PSAP) callbacks by transmitting, by a wireless transmit/receive unit (WTRU) in a first network, a registration message, to a PSAP in a second network. Upon registration, the WTRU receives a registration response including an information element (IE) and stores the IE. The PSAP, which may be located in either an internet protocol (IP) Network or a public switched telephone network (PSTN), transmits an emergency callback to the WTRU and includes the IE.

16 Claims, 9 Drawing Sheets

(56) References Cited

OTHER PUBLICATIONS

Third Generation Partnership Project, "Technical Specification Group Core Network and Terminals; Interworking between the IP Multimedia (IM) Core Network (CN) subsystem and Circuit Switched (CS) networks (Release 9)," 3GPP TS V9.8.0 (Dec. 2011).

Third Generation Partnership Project, "Technical Specification Group Core Network and Terminals; Interworking between the IP Multimedia (IM) Core Network (CN) subsystem and Circuit Switched (CS) networks (Release 9)," 3GPP TS 29.163 V9.4.0 (Dec. 2011).

Third Generation Partnership Project, "Technical Specification Group Core Network and Terminals; Interworking between the IP Multimedia (IM) Core Network (CN) subsystem and Circuit Switched (CS) networks (Release 10)," 3GPP TS 29.163 V10.0.0 (Dec. 2010).

Third Generation Partnership Project, "Technical Specification Group Core Network and Terminals; Interworking between the IP Multimedia (IM) Core Network (CN) subsystem and Circuit Switched (CS) networks (Release 10)," 3GPP TS 29.163 V10.4.0 (Dec. 2011).

Third Generation Partnership Project, "Technical Specification Group Core Network and Terminals; Interworking between the IP Multimedia (IM) Core Network (CN) subsystem and Circuit Switched (CS) networks (Release 11)," 3GPP TS 29.163 V11.1.0 (Dec. 2011).

Third Generation Partnership Project, "Technical Specification Group Core Network and Terminals; IP multimedia call control protocol based on Session Initiation Protocol (SIP) and Session Description Protocol (SDP); Stage 3 (Release 11)," 3GPP TS 24.229 V11.2.1 (Jan. 2012).

Third Generation Partnership Project, "Technical Specification Group Core Network and Terminals; IP multimedia call control protocol based on Session Initiation Protocol (SIP) and Session Description Protocol (SDP); Stage 3 (Release 10)," 3GPP TS 24.229 V10.6.1 (Jan. 2012).

Third Generation Partnership Project, "Technical Specification Group Core Network and Terminals; IP multimedia call control protocol based on Session Initiation Protocol (SIP) and Session Description Protocol (SDP); Stage 3 (Release 10)," 3GPP TS 24.229 V10.2.0 (Dec. 2010).

Third Generation Partnership Project, "Technical Specification Group Core Network and Terminals; IP multimedia call control protocol based on Session Initiation Protocol (SIP) and Session Description Protocol (SDP); Stage 3 (Release 9)," 3GPP TS 24.229 V9.10.1 (Jan. 2012).

Third Generation Partnership Project, "Technical Specification Group Core Network and Terminals; IP multimedia call control protocol based on Session Initiation Protocol (SIP) and Session Description Protocol (SDP); Stage 3 (Release 9)," 3GPP TS 24.229 V9.6.0 (Dec. 2010).

Third Generation Partnership Project, "Technical Specification Group Core Network and Terminals; IP multimedia call control protocol based on Session Initiation Protocol (SIP) and Session Description Protocol (SDP); Stage 3 (Release 8)," 3GPP TS 24.229 V8.18.1 (Jan. 2012).

Third Generation Partnership Project, "Technical Specification Group Core Network and Terminals; IP multimedia call control protocol based on Session Initiation Protocol (SIP) and Session Description Protocol (SDP); Stage 3 (Release 8)," 3GPP TS 24.229 V8.14.0 (Dec. 2010).

Third Generation Partnership Project, "Technical Specification Group Core Network and Terminals; IP multimedia call control protocol based on Session Initiation Protocol (SIP) and Session Description Protocol (SDP); Stage 3 (Release 7)," 3GPP TS 24.229 V7.26.1 (Jan. 2012).

Third Generation Partnership Project, "Technical Specification Group Core Network and Terminals; IP multimedia call control protocol based on Session Initiation Protocol (SIP) and Session Description Protocol (SDP); Stage 3 (Release 7)," 3GPP TS 24.229 V7.22.0 (Dec. 2010).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.28.0 (Sep. 2011).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.25.0 (Dec. 2010).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.25.0 (Sep. 2011).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.24.0 (Dec. 2010).

Third Generation Partnership Project, "Technical Specification Group Services and System Aspects; IP Multimedia Subsystem (IMS) emergency sessions (Release 11)," 3GPP TS 23.167 V11.3.0 (Dec. 2011).

Third Generation Partnership Project, "Technical Specification Group Services and System Aspects; IP Multimedia Subsystem (IMS) emergency sessions (Release 7)," 3GPP TS 23.167 V7.12.0 (Dec. 2009).

Third Generation Partnership Project, "Technical Specification Group Services and System Aspects; IP Multimedia Subsystem (IMS) emergency sessions (Release 8)," 3GPP TS 23.167 V8.5.0 (Dec. 2009).

Third Generation Partnership Project, "Technical Specification Group Services and System Aspects; IP Multimedia Subsystem (IMS) emergency sessions (Release 9)," 3GPP TS 23.167 V9.5.0 (Dec. 2010).

Third Generation Partnership Project, "Technical Specification Group Services and System Aspects; IP Multimedia Subsystem (IMS) emergency sessions (Release 9)," 3GPP TS 23.167 V9.8.0 (Dec. 2011).

Third Generation Partnership Project, "Technical Specification Group Services and System Aspects; IP Multimedia Subsystem (IMS) emergency sessions (Release 10)," 3GPP TS 23.167 V10.2.1 (Jan. 2011).

Third Generation Partnership Project, "Technical Specification Group Services and System Aspects; IP Multimedia Subsystem (IMS) emergency sessions (Release 10)," 3GPP TS 23.167 V10.5.0 (Dec. 2011).

Third Generation Partnership Project, "Technical Specification Group Services and System Aspects; IP Multimedia Subsystem (IMS) emergency sessions (Release 11)," 3GPP TS 23.167 V11.0.1 (Jan. 2011).

\* cited by examiner

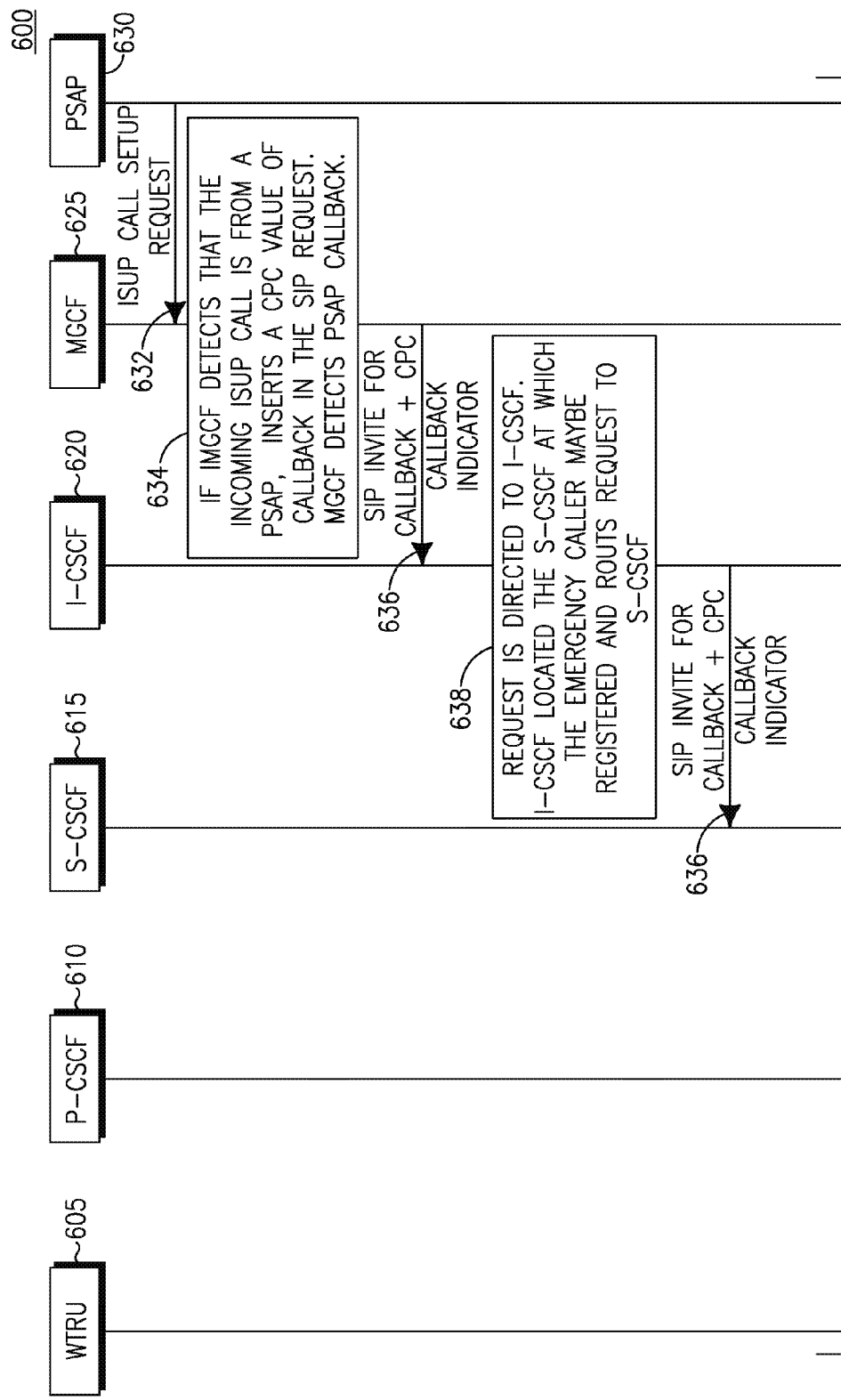

IDENTIFYING PUBLIC SAFETY ANSWERING POINT (PSAP) CALLBACKS IN INTERNET PROTOCOL (IP) MULTIMEDIA SUBSYSTEM (IMS) EMERGENCY SERVICES

CROSS REFERENCE TO RELATED APPLICATIONS

This application claims the benefit of U.S. Provisional Application No. 61/433,053 filed on Jan. 14, 2011, the contents of which are hereby incorporated by reference herein.

BACKGROUND

A public safety answering point (PSAP) may send an callback to a device that initiated an emergency call. The callback may occur for a variety of reasons such as the call being cut short or the PSAP may need additional information to react to the emergency appropriately. A PSAP callback is treated as a normal incoming call, which may be subject to services such as call forwarding that may interfere with the callback reaching the appropriate device. In addition, determining which device placed the emergency call may be difficult. Accordingly, it would be advantageous to identify the emergency caller by network and device in order to ensure the callback reaches its destination.

SUMMARY

A method and apparatus for identifying public safety answering point (PSAP) callbacks by transmitting, by a wireless transmit/receive unit (WTRU) in a first network, a registration message, to a serving call session control function (S-CSCF) in a second network. Upon registration, the WTRU receives a registration response including an information element (IE) and stores the IE. The received IE is included in an emergency call transmitted to a PSAP. The PSAP, which may be located in either an internet protocol (IP) Network or a public switched telephone network (PSTN), transmits an emergency callback to the WTRU and includes the IE.

BRIEF DESCRIPTION OF THE DRAWINGS

A more detailed understanding may be had from the following description, given by way of example in conjunction with the accompanying drawings wherein:

FIG. 6A and FIG. 6B are a flow diagram of callback from a PSTN based network using an emergency indicator.

DETAILED DESCRIPTION

Figure 1A:
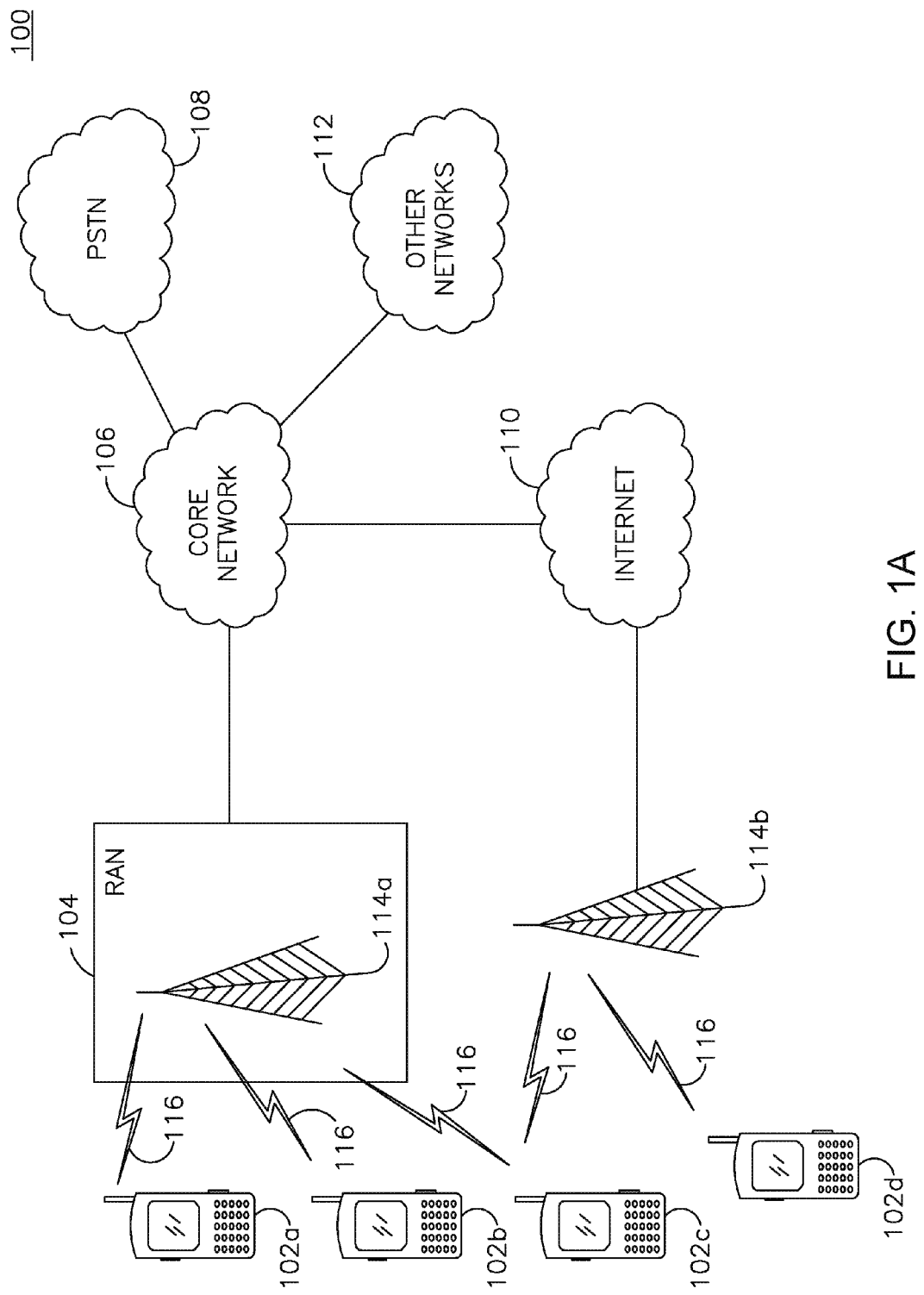
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
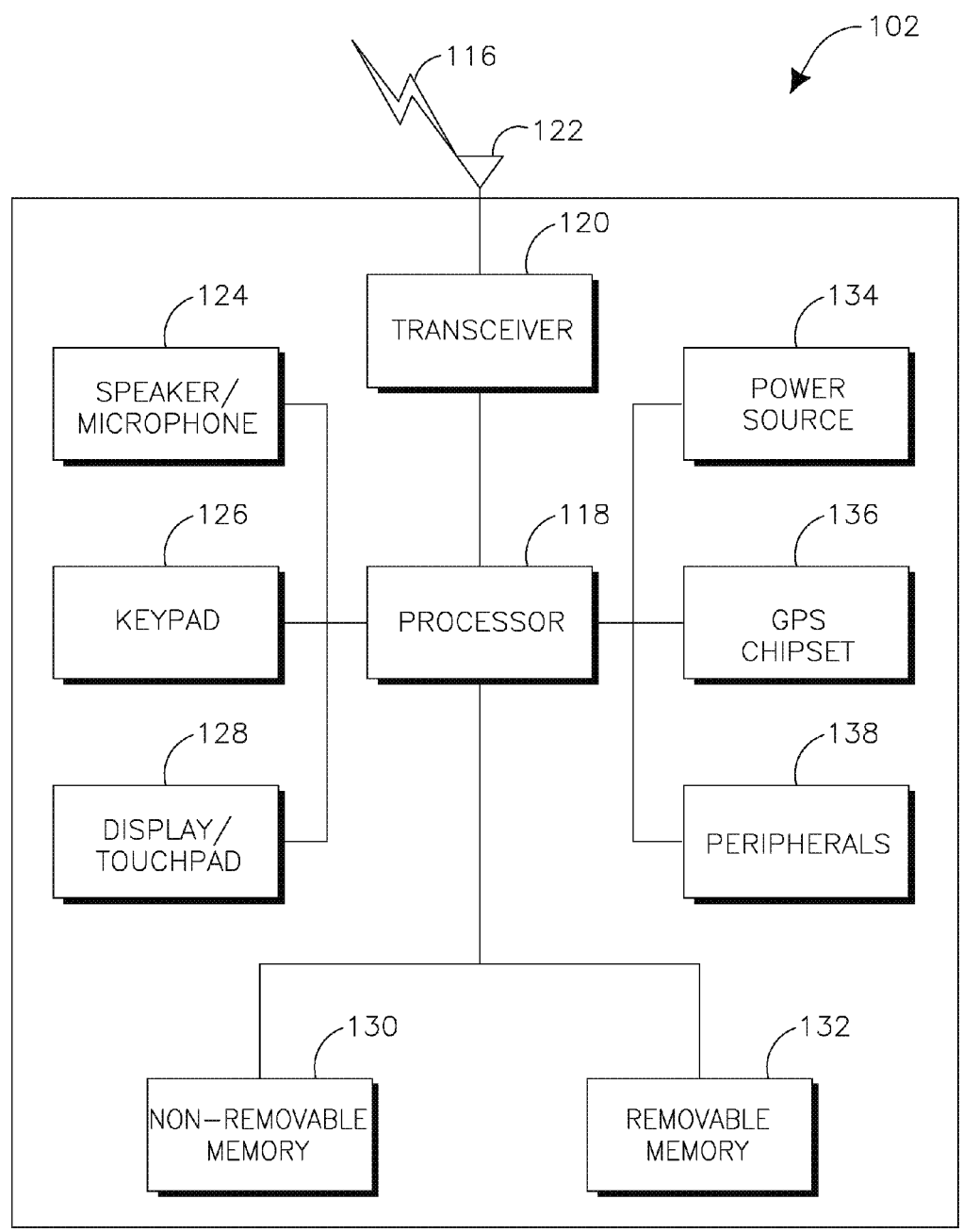
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
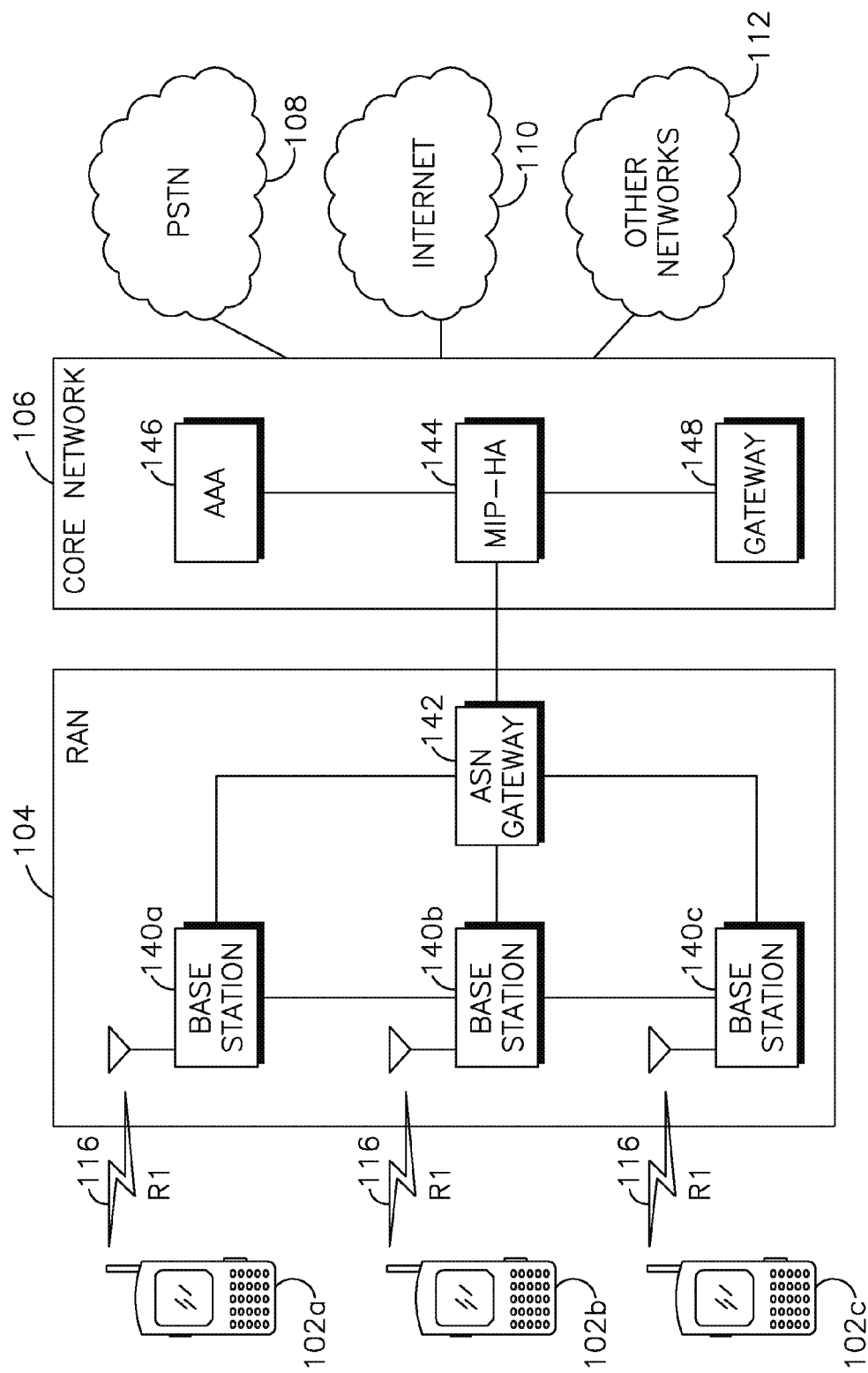
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

A public safety answering point (PSAP) may send a callback to a device that initiated an emergency call. The callback may occur for a variety of reasons, such as the call being cut short or the PSAP may need additional information to react to the emergency appropriately. A PSAP callback is treated as a normal incoming call, which may be subject to services, such as call forwarding, that may interfere with the callback reaching the appropriate device. A need to identify the emergency caller by the network and device in order to ensure the callback reaches its destination would be advantageous.

Figure 2:
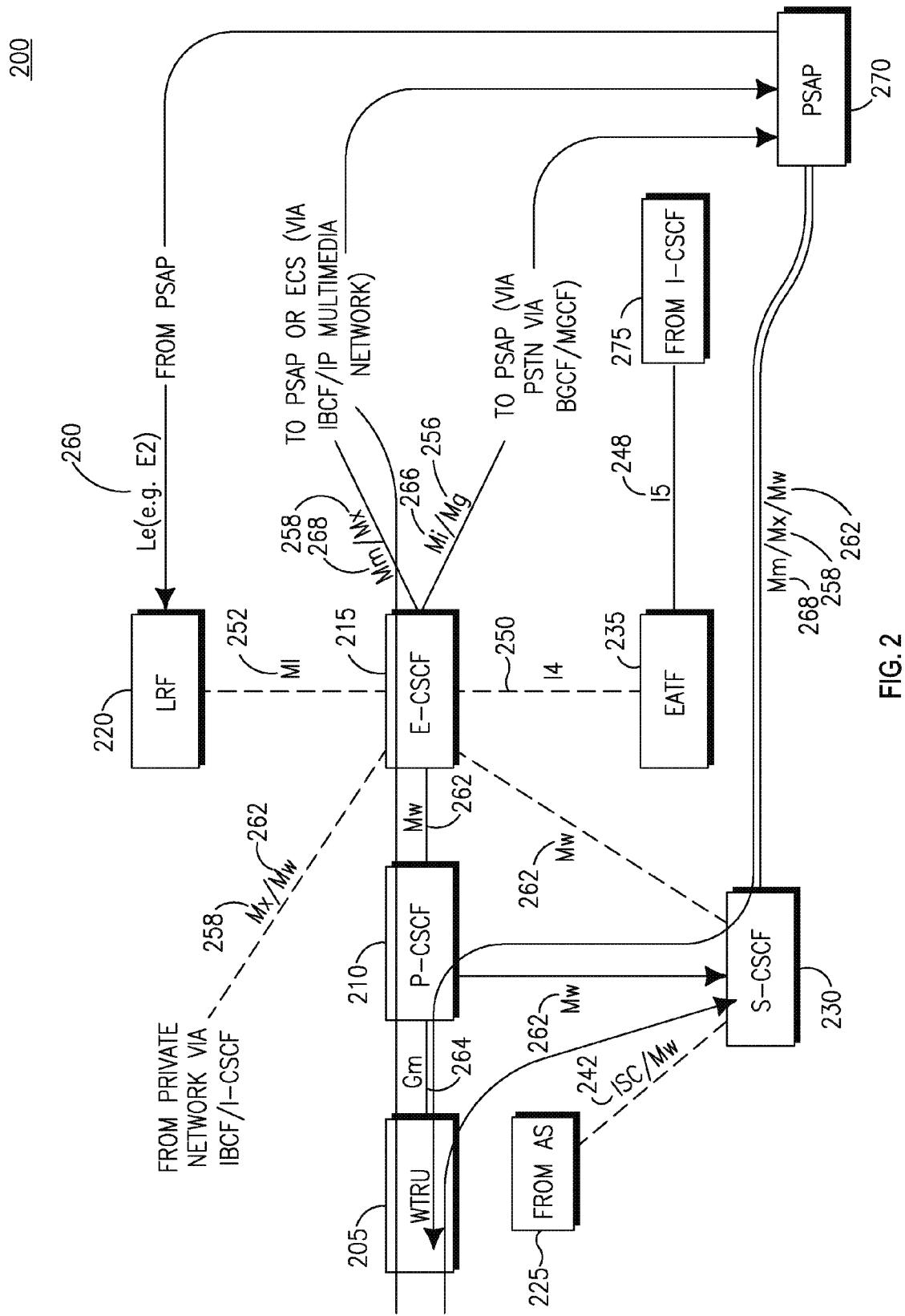
FIG. 2 is a block diagram of an emergency services architecture.

FIG. 2 is a block diagram 200 of an example of emergency services architecture. Architecture and procedures are required for handling emergency calls over the IMS. The architecture and procedures ensure that an emergency call initiated by an IMS WTRU is handled by the visited network, whether or not the visited network is the WTRU's home network. When a WTRU is roaming, it may be inappropriate for an emergency call to be routed to the WTRU's home network, which may be in a different geographic location than the WTRU.

Referring to FIG. 2, the proxy call session control function (P-CSCF) P-CSCF 210, emergency call session control function (E-CSCF) 215, location retrieval function (LRF) 220 and emergency access transfer function (EATF) 235 may be located in a visited network. The E-CSCF 215 and P-CSCF 210 may act as proxies for the WTRU 205 in order to transmit SIP requests.

The P-CSCF 210 may also be responsible for security between the WTRU 205 and itself. The Gm reference point 264 is a SIP-based reference point between the WTRU 205 and the P-CSCF 210. The P-CSCF 210 is the initial SIP signaling contact point for the WTRU 205. The P-CSCF 210 is responsible for forwarding SIP registration messages from the WTRU 205, to a CSCF (I-CSCF) 275. The I-CSCF 275 may determine a suitable serving CSCF (S-CSCF) 230 for the WTRU 205 and the I-CSCF may transmit SIP registration messages, subsequent call set-up requests and responses to the S-CSCF 230. The P-CSCF 210 maintains a security association, for both authentication and confidentiality. The P-CSCF 210 supports emergency call local routing within the visited network, accounting, session timers and admission control.

The E-CSCF 215 may route emergency SIP requests to PSAPs. The E-CSCF 215 receives the SIP request, determines the emergency services requested and based upon the WTRUs 205 location, determines the PSAP address in order to transmit the SIP request. The PSAP address may be resolved through a combination of location and the type of emergency. The PSAP 270 may reside in a public switched telephone network (PSTN) or may be an Internet protocol (IP) based PSAP. The E-CSCF 215 may directly send the SIP request to an IP based PSAP. If the PSAP 270 resides in the PSTN, the SIP request may be configured to be routed to the PSAP 270 via an integrated services digital network (ISDN) user part (ISUP) request. The E-CSCF 215 uses Mw 262, Mg 256, Mi 266, Ml 252, Mm 268, Mx 258 and I4 250 reference points to connect to other IMS entities and other IP Networks.

The Mm 268 reference point is a SIP-based reference point that connects the IMS to other IP-based multimedia networks. The Mw 262 reference point provides for an interface between the P-CSCF 210 and E-CSCF 215 or S-CSCF 230. The Mw 262 reference point may define the messages that are used between the CSCFs of any type in both the network operator's IMS and CSCFs in other network operators' IMSs.

The Mi 266 reference point may be used to complete a session to the circuit-switched domain. The Mg 256 reference point links the media gateway control function (MGCF), to the IMS. I4 250 may be used as a reference point between an E-CSCF 215 and an EATF 235. I5 248 may be used as a reference point between an I-CSCF 275 and an EATF 235.

The AS 225 and S-CSCF 230 may be located in the home network. An ISC/Mw 242 reference point may be used between the AS 225 and the S-CSCF 230. The S-CSCF 230 may act as a registrar for the WTRU 205 during IMS registration. During an emergency registration, the WTRU 205 may transmit an emergency signal via the P-CSCF 210 to the S-CSCF 230.

An emergency call establishment request may be transmitted by WTRU 205. WTRU 205 transmits a SIP INVITE request to the PSAP 270 in the visited network via P-CSCF 210 and E-CSCF 215. By routing the emergency call via a P-CSCF 210 and E-CSCF 215 in the visited network, the emergency call is handled by the visited network without involving WTRUs 205 home network. The SIP INVITE request may be transmitted to the PSAP 270 which may be located in a PSTN. Interworking from the IMS to the PSTN may be performed via the breakout gateway control function/media gateway control function (BGCF/MGCF).

Alternatively, the PSAP 270 maybe located in an IP based multimedia network. The SIP INVITE request may be transmitted to the PSAP 270 or to an Emergency Services Network (ESN) via an interconnection border control function internet protocol (IBCF/IP) multimedia network. The IBCF provides overall control of the boundary between different service provider networks and provides security for the IMS network.

The PSAP 270 may initiate an emergency callback to WTRU 205. The PSAP 270 may transmit the callback signal to the WTRU 205 via the S-CSCF 230 in the home network and the P-CSCF 210 in the visited network. The PSAP 270 may use Mm 268, Mx 258 and Mw 262 reference points to connect to the S-CSCF 230. An emergency callback may be necessary if an original emergency call was cut short, upon a loss of connection or on the condition that the PSAP 270 requires a follow-up to the emergency call for additional information, for example.

The PSAP 270 callback may be categorized as an emergency callback in order to transmit the emergency callback to the WTRU that initiated the original signal to which the callback is responding. The emergency callback may be transmitted as a normal IMS incoming call and may be subject to subscribed services such as call forwarding. Subjecting the callback to subscribed services may be disadvantageous and may prevent the callback from reaching the WTRU 205. By identifying callback, it may be treated differently than other incoming calls. In addition, subscribed services may be disabled for callbacks.

Callbacks may be initiated by a PSAP 270 located in either a PSTN or IP network. The PSAP 270 may initiate a communication with the LRF 220 in the visited network in order to obtain additional location information of the WTRU 205. A Le reference point 260 is used between the LRF 220 and the PSAP 270.

The I-CSCF 275 may communicate with the WTRU via the EATF 235 in the visited network. The I-CSCF 275 may interrogate an HSS in order to determine which S-CSCF to route an incoming call. The EATF 235 may communicate with the WTRU 205 via the E-CSCF 215 and the P-CSCF 210.

The application server (AS) 225 may initiate an emergency call with the WTRU 205 via the S-CSCF 230 in the home network. The S-CSCF 230 transmits the communication to the WTRU 205 via the E-CSCF 215 and the P-CSCF 210.

At any point in the method of FIG. 2, additional actions may be performed between WTRU 205, P-CSCF 210, E-CSCF 215, LRF 220, EATF 235, S-CSCF 230, I-CSCF 275, PSAP 270 and AS 225.

Figure 3:
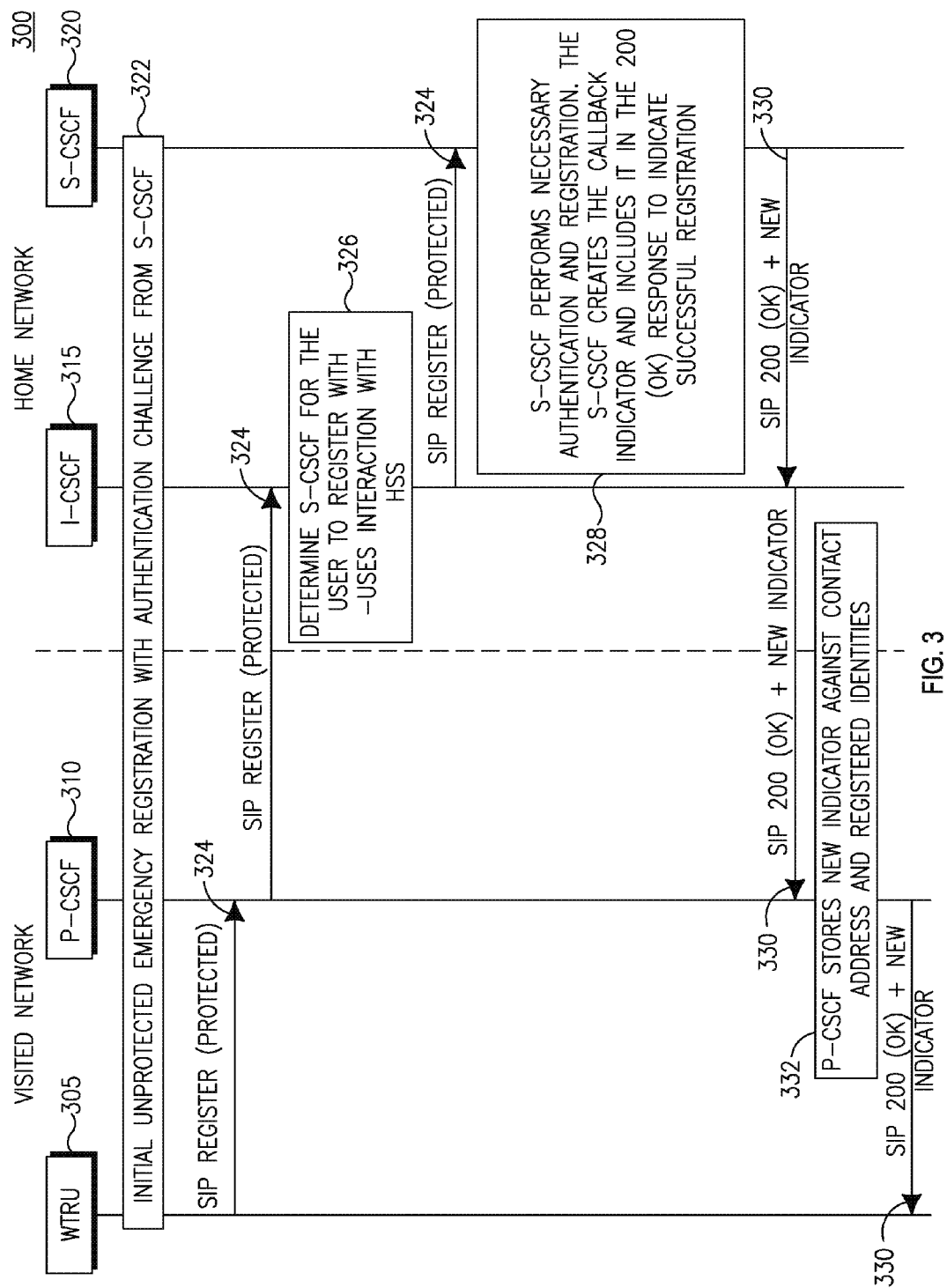
FIG. 3 is a call flow diagram of an example of a registration procedure including a emergency indicator for callback.

FIG. 3 is a call flow diagram 300 of the communication of an indicator for callback in an emergency procedure. During an emergency registration, the WTRU 305 and the P-CSCF 310 receive an information element (IE) from the S-CSCF 320. The receipt of the IE occurs prior to the transmission of an emergency call. A WTRU 305 may determine to transmit an emergency call request, and includes the received IE with the emergency request.

Referring to FIG. 3, a WTRU 305 in a visited network may initiate an initial unprotected emergency registration 322. A S-CSCF 320 may transmit an authentication challenge to the WTRU 305. The WTRU 305 transmits a protected SIP REGISTER message 324 for emergency registration to the S-CSCF 320 via the P-CSCF 310 in the visited network and the I-CSCF 315 in the home network. The WTRU 305 may receive a callback indicator from the S-CSCF 320 upon successful registration. In addition, the P-CSCF 310 may act as a proxy for the WTRU 305 in the visited network.

Once the I-CSCF 315 receives the SIP REGISTER message 324 from the P-CSCF 310, the I-CSCF 315 determines 326 the appropriate S-CSCF 320for the WTRU 305 to register, using an interaction with the home subscriber server (HSS). Once determined, the I-CSCF 315 transmits the SIP REGISTER 324 to the appropriate S-CSCF 320. The S-CSCF 320 performs authentication and registers 328 the identity of the WTRU 305 by binding the identity to contact header information.

The S-CSCF 320 creates a token piece of information, an IE, as the call back indicator, which may be used by a PSAP in an callback to a WTRU 305 which initiated an emergency call. The S-CSCF 320 includes the information element in the SIP 200 (OK) response 330 transmitted to the WTRU 305 via the P-CSCF 310. The SIP 200 (OK) 330 may be transmitted in order to indicate successful registration by the WTRU 305 with the S-CSCF 320. The indicator may be included in the contact header of the SIP 200 (OK) response 330. Other fields in the SIP 200 (OK) response may alternatively be used to carry the callback indicator.

The indicator may also be included in a SIP INVITE request initiated by the WTRU 305 in any emergency call. Additionally, the indicator may be included in any appropriate header field in any message that is exchanged between the WTRU 305 and the PSAP. On a condition that the indicator is unique based on the emergency registration, further correlation may be required where the callback may be further verified as originating from a particular PSAP that received the emergency call. The indicator may be a parameter that includes a unique value.

The S-CSCF 320 sends the SIP 200 (OK) message 330 that includes the new indicator to the WTRU 305 via the I-CSCF 315 in the home network and the P-CSCF 310 in the visited network. The P-CSCF 310 stores the new indictor 332 with reference to the registered identity and contact address of the WTRU 305. By storing this information, the P-CSCF 310 is able to check, in the event of an emergency call initiated by the WTRU 305, that the appropriate indicator is included in the emergency call to the PSAP. For example, the WTRU 305 may initiate an emergency call, but may not have included the indicator in the emergency message. On a condition that the WTRU 305 did not include the indicator, the P-CSCF 310 includes the indictor in the emergency message. Further, on the condition of a callback from a PSAP, the PSAP includes the indicator in the callback request to the WTRU 305. The S-CSCF 320 that was involved in the registration procedure will receive the callback from the PSAP and may suppress any subscribed services available to the WTRU 305 and may direct the call to the WTRU 305 that initiated the emergency call and include the indicator.

At any point in the method of FIG. 3, additional actions may be performed between WTRU 305, P-CSCF 310, C-CSCF 315 and S-CSCF 320.

Figure 4:
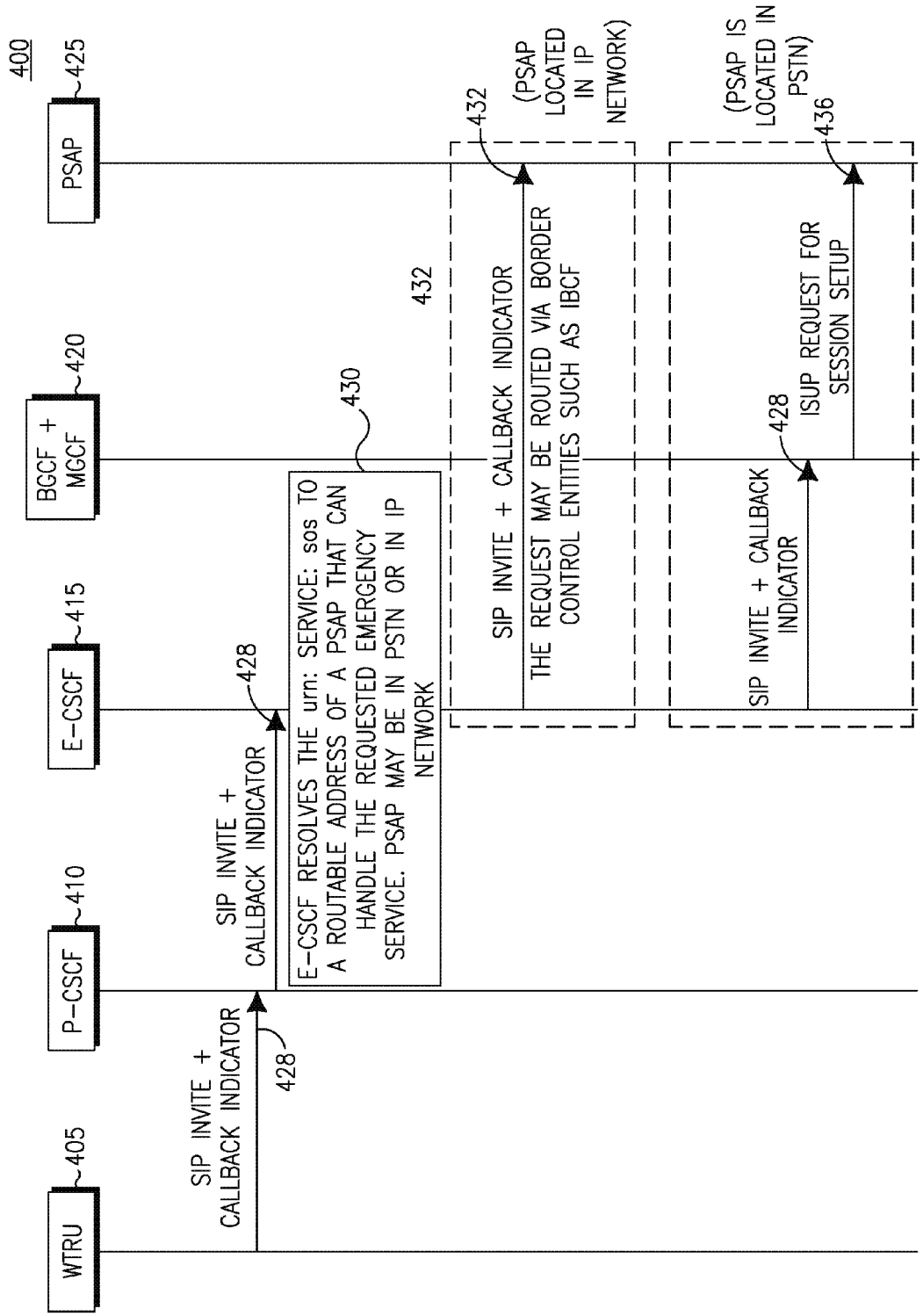
FIG. 4 is a call flow diagram of an example of a usage of the registration procedure including an emergency indicator for callback.

FIG. 4 is a call flow diagram 400 of the transmission of an emergency call that includes a callback indicator from a WTRU to a PSAP. The callback indicator may have been previously established in a registration procedure, such as the procedure identified in FIG. 3.

Referring to FIG. 4, the WTRU 405 transmits a SIP INVITE request 428 that includes a request URI with an urn:service:sos address and the callback indicator to the PSAP 425 via the P-CSCF 410 and the E-CSCF 415. The E-CSCF 415 resolves 430 the urn:service:sos address to a routable address of a PSAP 425 that may be able to handle the requested emergency service. The PSAP 425 may be in a PSTN or an IP network.

On a condition that the PSAP is located in an IP network, the E-CSCF 415 transmits the SIP INVITE 428 that includes the request URI with a sip:psap address and a call back indicator to the PSAP 425 located in an IP network 432. The request may be routed via border control entities such as a IBCF 432.

Alternatively, the PSAP may be located in a PSTN and the E-CSCF 415 transmits the SIP INVITE 428 that includes the request URI with a sip:psap address and a call back indicator to the PSAP via a BGCF+MGCF 420. The BGCF+MGCF 420 transmits an ISUP request for session setup 436 to the PSAP 425 located in the PSTN.

In an embodiment, the WTRU 405 may not insert the callback indicator in the call, since the WTRU 405 may not be aware that the call is an emergency call. Under normal procedures, the WTRU 405 may know that the call that is initiated by the user is an emergency call. For example, WTRU 405 may recognize the dialed digits as an emergency service number. WTRU 405 may resolve the dialed digits to a service URN, which is included in the request URI of the SIP INVITE.

On a condition that WTRU 405 does not recognize the dialed digits as an emergency call, WTRU 405 may include the dialed digits in the request URI. The P-CSCF 410 may detect that the dialed digits pertain to an emergency service, and may replace the dialed digits with the appropriate service URN.

The P-CSCF 410 may be aware that the call is an emergency call. The P-CSCF 410 determines whether the call back indicator is present in the call. On a condition that WTRU 405 may not have included the callback indicator, the P-CSCF 410 may include the callback indicator received during emergency registration. On a condition that emergency registration did not occur, an indicator may not exist.

The call back indicator may be included in a normal non-emergency registration, but may be policed by the P-CSCF 410 to only be included in INVITE requests pertaining to emergency calls. This may prevent misuse by the WTRU 405 of the callback indicator in non-emergency requests.

The P-CSCF 410 may insert the callback indicator if a callback indicator is stored for the emergency registered contact address and public user identities that were registered during emergency registration for the WTRU 405.

At any point in the method of FIG. 4, additional actions may be performed between WTRU 405, P-CSCF 410, E-CSCF 415, BGCF+MGCF 420 and PSAP 425.

Figure 5:
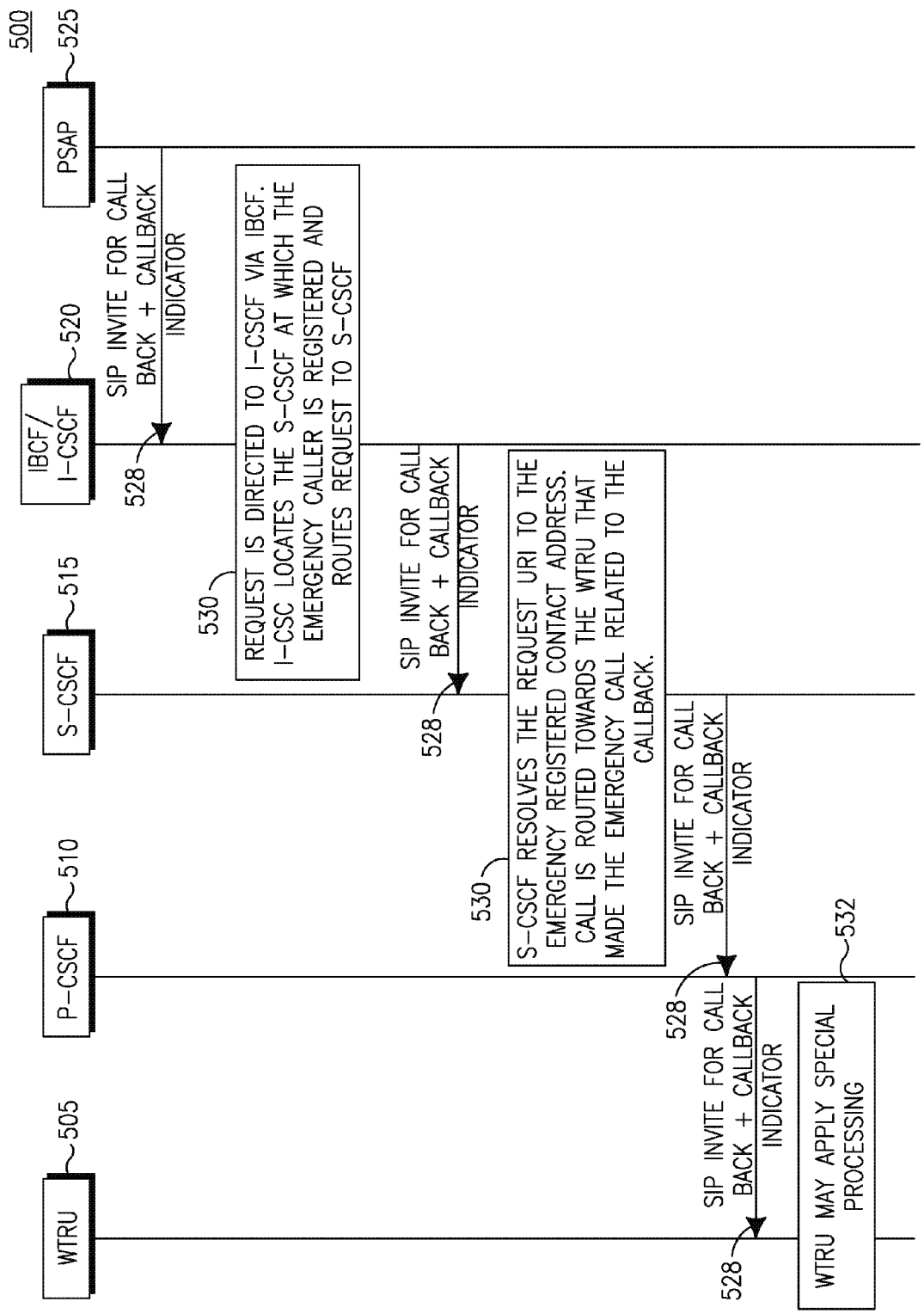
FIG. 5 is a call flow diagram of an example of call back from a PSAP based network using an emergency indicator.

FIG. 5 is a flow diagram 500 of an example of a new callback indicator included in a PSAP callback from an IP based PSAP 525. The PSAP 525 may transmit an SIP INVITE 528 for callback that includes a callback indicator to the WTRU 505. The SIP INVITE 528 may be transmitted from the PSAP 525 to an I-CSCF 520 via IBCF. The I-CSCF 520 locates 530 the S-CSCF 515 at which the emergency caller, (e.g., WTRU), is registered and routes the SIP INVITE 528 callback to the S-CSCF 515. The S-CSCF 515 determines the emergency registered contact address of the WTRU 505 that initiated the emergency call in order to transmit the SIP INVITE 528 callback and resolve the request URI. The S-CSCF 515 determines 530 whether the callback indicator is the same as the one that was provided during emergency registration. Terminating services may not be applied to the call and the call is routed to the WTRU 505 that made the emergency call related to the SIP INVITE 528 callback.

The S-CSCF 515 transmits the SIP INVITE 528 for callback to the WTRU 505 via the P-CSCF 510. The WTRU 505 may apply special processing 532 to ensure callback is handled correctly. For example, the WTRU 505 may disable services that may be applied to the call such as call forwarding, silent mode or the ability to place a call on hold.

At any point in the method of FIG. 5, additional actions may be performed between WTRU 505, P-CSCF 510, S-CSCF 515, I-CSCF 520 and PSAP 525.

Figure 6B:
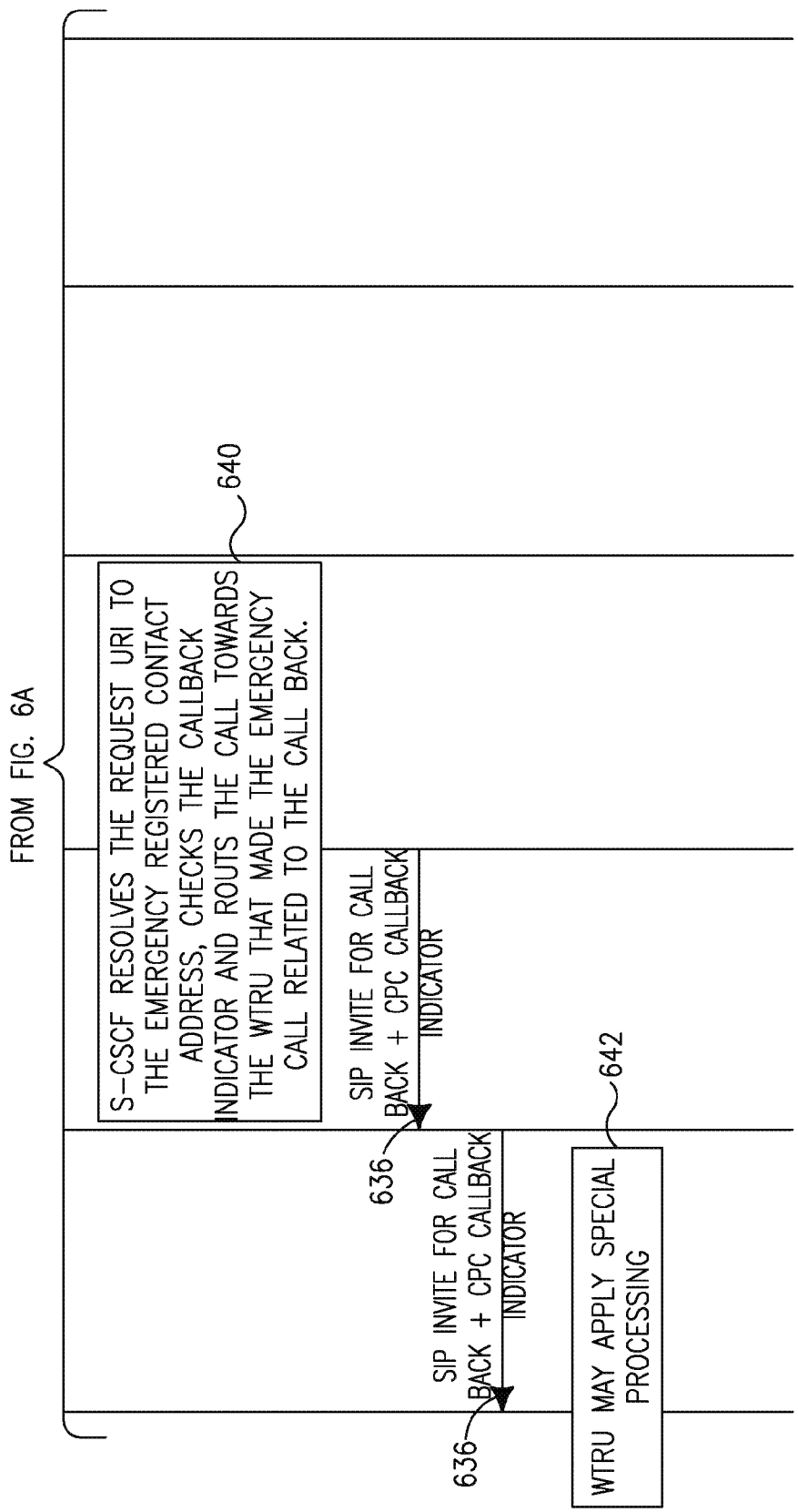

FIGS. 6A and 6B are a call flow diagram 600 of an example of a new callback indicator included in a PSAP callback from a PSTN based PSAP 630. The PSAP 630 may transmit an ISUP call setup request 632 to the MGCF 625. On a condition that the MGCF 625 detects 634 that the ISUP call setup request 632 is from the PSAP 630, it may insert a calling party's category (CPC) value of callback in the SIP request 636 and may send the SIP request 636 with the CPC value to the WTRU 605. The CPC indicates a callback from the PSAP 630 located in the PSTN. The CPC is an ISUP request parameter which is inserted by the MGCF 625 with a value of callback in the P-Asserted-Identity header of the ISUP request 632. The MGCF 625 may use another parameter in another header field to also indicate a callback.

The MGCF 625 may detect the PSAP callback either through information in the ISUP request 632 that may indicate the callback, or through a number analysis or trunk analysis, for example. The MGCF 625 may transmit the SIP INVITE 636 for call back that includes the CPC call back indicator to the WTRU 605 via the I-CSCF 620. The I-CSCF 620 may locate 638 the S-CSCF 615 at which the emergency caller (for example, the WTRU 605) is registered, and routes the request to the S-CSCF 615.

The S-CSCF 615 determines 640 the emergency registered contact address of the WTRU 605 that initiated the emergency call in order to transmit the SIP INVITE callback 636 and resolve the request URI. The S-CSCF 615 determines whether the callback indicator is the same as the one that was provided during emergency registration. Terminating services may not be applied to the call and the call is routed to the WTRU 605 that made the emergency call related to the SIP INVITE callback 636.

The S-CSCF 615 transmits the SIP INVITE 636 for callback to the WTRU 605 via the P-CSCF 610. The WTRU 605 may apply special processing to ensure callback is handled correctly. For example, the WTRU 605 may disable services 642 that may be applied to the call such as call forwarding.

At any point in the method of FIG. 6, additional actions may be performed between WTRU 605, P-CSCF 610, S-CSCF 615, I-CSCF 620, MGCF 625 and PSAP 630.

The procedures described in FIGS. 3-6B may be performed by the WTRU 102 identified in FIG. 1B. The transceiver 120 may be configured but not limited to transmitting the registration and emergency request messages described herein, while the processor 118 may be configured but not limited to generating the request messages, processing the registration response, storing the IE and suppressing subscribed services. In addition, the transceiver 120 may be configured but not limited to receiving the registration response including an IE and receiving a PSAP callback.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:
   transmitting, by the WTRU in a first network, a registration message to a service call session control function (S-CSCF) in a second network;
   receiving, by the WTRU, a registration response including an information element (IE) including a public safety answering point (PSAP) callback identifier, wherein the IE is stored by the WTRU;
   transmitting, by the WTRU, an emergency call to the PSAP in the second network, wherein the emergency call includes the PSAP callback identifier; and
   receiving, by the WTRU, a callback from the PSAP.

2. The method of claim 1, wherein the registration message is an emergency registration request that includes authentication information.

3. The method of claim 1, wherein the registration message is transmitted via a proxy call session control function (P-CSCF).

4. The method of claim 1, wherein the registration response is received prior to transmission of the emergency call.

5. The method of claim 1, wherein the second network is an internet protocol (IP) Multimedia Subsystem (IMS) Network.

6. The method of claim 1, wherein the second network is a public switched telephone network (PSTN).

7. A wireless transmit/receive unit (WTRU) comprising:
a transmitter configured to transmit a registration message to a service call session control function (S-CSCF) in a second network; and
a receiver configured to receive a registration response including an information element (IE) including a public safety answering point (PSAP) callback identifier, wherein the IE is stored by the WTRU; and
wherein the transmitter is further configured to transmit an emergency call to the PSAP in the second network, wherein the emergency call includes the PSAP callback identifier;
wherein the receiver is further configured to receive a callback from the PSAP;
wherein the WTRU is located in a first network.

8. The WTRU of claim 7 wherein the registration message is an emergency registration request that includes authentication information.

9. The WTRU of claim 7 wherein the registration message is transmitted via a proxy call session control function (P-CSCF).

10. The WTRU of claim 7 wherein the registration response is received prior to transmission of an emergency call.

11. The WTRU of claim 7 wherein the second network is an internet protocol (IP) Multimedia Subsystem (IMS) Network.

12. The WTRU of claim 7 wherein the second network is a public switched telephone network (PSTN).

13. A public safety answering point (PSAP) comprising:
a processor configured to generate an information element (IE) including a PSAP callback identifier;
a transmitter configured to transmit a registration response including the IE which includes the PSAP callback identifier;
a receiver configured to receive an emergency call from a wireless transmit/receive unit (WTRU) in a first network, wherein the emergency call includes the PSAP callback identifier; and
a transmitter configured to transmit a callback;
wherein the PSAP is located in a second network.

14. A proxy call session control function (P-CSCF) comprising:
a receiver configured to receive a registration message from a wireless transmit/receive unit (WTRU) in a first network;
a transmitter configured to transmit the registration message to a service call session control function (S-CSCF) in a second network;
the receiver further configured to receive a registration response including an information element (IE) including a public safety answering point (PSAP) callback identifier, wherein the IE is stored by the P-CSCF; and
wherein the receiver is further configured to receive an emergency call from the WTRU in the first network, wherein the emergency call includes the PSAP callback identifier, and receive a callback from the PSAP;
wherein the transmitter is further configured to transmit the emergency call to the PSAP in the second network, and transmit the callback to the WTRU;
wherein the P-CSCF is located in the first network.

15. Original) The P-CSCF of claim 14 wherein the WTRU inserts the PSAP callback identifier in the emergency call.

16. The P-CSCF of claim 14 wherein the P-CSCF inserts the PSAP callback identifier in the emergency call.

\* \* \* \* \*

UNITED STATES PATENT AND TRADEMARK OFFICE
CERTIFICATE OF CORRECTION

PATENT NO. : 8,565,714 B2
APPLICATION NO. : 13/348968
DATED : October 22, 2013
INVENTOR(S) : Milan Patel Page 1 of 1

It is certified that error appears in the above-identified patent and that said Letters Patent is hereby corrected as shown below:

ON THE TITLE PAGE

At item (73) Assignee: delete "Interdigital" and insert therefor --InterDigital--;

IN THE CLAIMS

In Claim 15, at column 14, line 31, delete "Original)".

Signed and Sealed this
Ninth Day of June, 2015

Michelle K. Lee
*Director of the United States Patent and Trademark Office*